US009854164B1

(12) United States Patent
Kozko et al.

(10) Patent No.: US 9,854,164 B1
(45) Date of Patent: Dec. 26, 2017

(54) SINGLE SENSOR MULTIPLE LENS CAMERA ARRANGEMENT

(71) Applicant: IC REAL TECH, INC., Pompano Beach, FL (US)

(72) Inventors: Dmitry Kozko, Aventura, FL (US); Ivan Onuchin, Hollywood, FL (US)

( * ) Notice: Subject to any disclaimer, the term of this patent is extended or adjusted under 35 U.S.C. 154(b) by 0 days.

(21) Appl. No.: 14/831,457

(22) Filed: Aug. 20, 2015

Related U.S. Application Data

(63) Continuation-in-part of application No. 14/260,807, filed on Apr. 24, 2014, which is a continuation-in-part of application No. 14/144,675, filed on Dec. 31, 2013.

(60) Provisional application No. 62/128,735, filed on Mar. 5, 2015.

(51) Int. Cl.
| | |
|---|---|
| *G02B 17/08* | (2006.01) |
| *G02B 13/06* | (2006.01) |
| *H04N 5/232* | (2006.01) |
| *G02B 13/00* | (2006.01) |
| *G02B 7/02* | (2006.01) |

(52) U.S. Cl.
CPC ......... *H04N 5/23238* (2013.01); *G02B 7/021* (2013.01); *G02B 13/0065* (2013.01); *G02B 13/06* (2013.01); *G02B 17/08* (2013.01); *H04N 5/23232* (2013.01)

(58) Field of Classification Search
CPC . H04N 13/0242; H04N 5/2253; H04N 5/2254
See application file for complete search history.

(56) References Cited

U.S. PATENT DOCUMENTS

| | | | | |
|---|---|---|---|---|
| 8,463,092 | B2 * | 6/2013 | Farahi | B32B 5/022 136/243 |
| 2005/0062869 | A1 * | 3/2005 | Zimmermann | G02B 13/06 348/335 |
| 2010/0045773 | A1 * | 2/2010 | Ritchey | G02B 13/06 348/36 |
| 2011/0234809 | A1 * | 9/2011 | Yen | G03B 33/02 348/164 |
| 2012/0206565 | A1 * | 8/2012 | Villmer | H04N 1/00 348/36 |

* cited by examiner

*Primary Examiner* — Obafemi Sosanya
(74) *Attorney, Agent, or Firm* — Dan DeLa Rosa

(57) ABSTRACT

An image capture device includes two fixed position ultra-wide angle lenses, one or more components to optically direct light, and a single image sensor. The two fixed position ultra-wide angle lenses face substantially opposing directions. A field of view of each of the lenses is greater than one hundred and eighty degrees. Facing the lenses in substantially opposing directions results in an overlapping region of image capture of substantially a three hundred and sixty degree horizontal field of view and a two hundred and seventy degree (or more) vertical field of view. The one or more components optically direct light so that optically directed light from both of the two fixed position ultra-wide angle lenses strikes a single surface of a single image sensor. The single image sensor converts an optical signal into an electronic signal.

20 Claims, 6 Drawing Sheets

SINGLE SENSOR MULTIPLE LENS CAMERA ARRANGEMENT

CROSS-REFERENCE TO RELATED APPLICATIONS

This utility application is a continuation in part of and claims the benefit of U.S. Provisional patent application Ser. No. 14/260,807 filed Apr. 24, 2014, converts and claims the benefit of U.S. Provisional Patent Application 62/128,735 filed 5 Mar. 2015. Through these patents, priority is claimed to provisional patent application 61/923,862 filed 6 Jan. 2014; provisional application No. 61/956,057 filed 30 May 2013; U.S. patent application Ser. No. 14/144,675 filed 31 Dec. 2013 claiming priority to provisional application 61/853,711 filed Apr. 10, 2013 and to provisional application 61/854,397 filed Apr. 23, 2013. The entire contents of the above applications (Ser. No. 14/260,807; 62/128,735; 61/923,862; 61/854,397; 61/956,057; 61/853,711; and Ser. No. 14/144,675) are incorporated by reference in their entirety herein.

BACKGROUND

The present invention relates to the optical device and, more particularly, to an optical device using a two ultra-wide lenses facing in opposing directions that utilize a single image sensor to convert an optical signal to an electrical one.

A number of components are utilized to digitally capture video and images, where the selection and arrangement of components dictates a quality of a captured information/imagery, an amount of processing needed to convert a raw capture into a desired form, a bill of materials required for the capture device, and the like. Traditional cameras pair one sensor per lens, so that the light directed trough the optics of a single lens falls upon a light sensitive region of a sensor to be converted into information. This one-to-one arrangement has advantages of simplicity and scalability.

As a number of lenses and sensors increases, however, the arrangement suffers from multiple issues. For instance, many devices (such as wearables, portable cameras, mobile phones, and internet-of-things devices) have a small footprint, which results in a challenge placing all necessary components (including processor, battery, multiple lenses, and multiple image sensors) within a space limited footprint challenging. These challenges based on footprint are exasperated by functional layout constraints related to what feasible layouts are viable given variances in power, heat, and other tolerance specific considerations, which often vary from component to component of a circuit board.

These challenges of board layout are further complicated when different lenses face in different directions, since the sensor is typically located directly behind (orthogonal to the direction of light) a lens. Multiple lens arrays with a one-to-one lens/sensor correspondence are often spherical, having multiple small circuit boards including an image sensor on a horizontal surface, where the planes of the different small boards are significantly angled relative to each other. This type of arrangement, though practical or even preferred in many use cases, is disfavored in others as use of a flat circuit board with all components printed on a single side substantially reduces manufacturing cost, footprint, and structural complications introduced by optical component requirements.

Timing issues also exist for devices having multiple lenses that capture images designed to be digitally stitched together. For instance, in a video capture scenario, a timing of frames representing video content of a dynamic scene obtained from different sensors must be synchronized, otherwise a resulting stitched image will have movement/timing based errors. This is particularly problematic with panoramic lens arrangements as slight image discrepancies based on timing may greatly diminish an accuracy of a surround image in a user appreciable manner. Some digital signal processing manipulations can be utilized, each of which results in an increased cost in terms of computing cycles and latency of a produced image. In real time and near-real time surround mode (panoramic) video capture situations processing induced latency can be a significant issue affecting a viability of a video system.

BRIEF SUMMARY

One aspect of the disclosure describes an image capture device comprising two fixed position ultra-wide angle lenses, two optically reflective surfaces, and a single image sensor. The two fixed position ultra-wide angle lenses face substantially opposing directions such that a field of view of each of the lenses is greater than one hundred and eighty degrees. The facing of the lenses in substantially opposing directions results in an overlapping region for at least a two hundred and seventy degree vertical arc about the image capture device. The image capture device substantially provides a three hundred and sixty degree horizontal field of view and substantially provides at least a two hundred and seventy degree vertical field of view. The two optically reflective surfaces comprise a first reflective surface and a second reflective surface. The first reflective surface optically directs light from a first one of the two fixed position ultra-wide lenses to a first region of a single image sensor. The second reflective surface optically directs light from a second one of the two fixed position ultra-wide lenses to a second region of the single image sensor. The first region and the second region are non-overlapping. The single image sensor converts optical image information contained within light striking the light sensitive plane into electronic information contained within an electronic signal such that the electronic information is a digital encoding of imagery information for the image capture of the three hundred and sixty degree horizontal field of view and of the at least two hundred and seventy degree vertical field of view.

One aspect of the disclosure describes an image capture device comprising two fixed position ultra-wide angle lenses, one or more components to optically direct light, and a single image sensor. Two fixed position ultra-wide angle lenses face substantially opposing directions. A field of view of each of the lenses is greater than one hundred and eighty degrees. The image capture device substantially provides a three hundred and sixty degree horizontal field of view and substantially provides at least a two hundred and seventy degree vertical field of view. The one or more components direct light from at least one of the two fixed position ultra-wide angle lenses such that optically directed light from both of the two fixed position ultra-wide angle lenses strikes a sensor laden continuous surface of a single image sensor. Two mutually exclusive, non-overlapping, elliptical regions of the surface of the single image sensor exist. One of the two mutually exclusive non-overlapping elliptical regions represents a region upon which light from a first of the two fixed position ultra-wide lenses strikes. A different one of the two mutually exclusive non-overlapping elliptical regions representing a second region upon which light from a second of the two fixed position ultra-wide lenses strikes. The single image sensor converts optical image information contained within light striking the light sensitive plane into electronic information contained within an electronic signal such that the electronic information is a digital encoding of imagery information for the image capture of the three hundred and sixty degree horizontal field of view and the at least two hundred and seventy degree vertical field of view.

One aspect of the disclosure describes an image capture device comprising two fixed position ultra-wide angle lenses, one or more components to optically direct light, and a single image sensor. The two fixed position ultra-wide angle lenses face substantially opposing directions. A field of view of each of the lenses is greater than one hundred and eighty degrees. Facing the lenses in substantially opposing directions results in an overlapping region of image capture of substantially a three hundred and sixty degree horizontal field of view and to at least a two hundred and seventy degree vertical field of view. The one or more components optically direct light from the two fixed position ultra-wide angle lenses so that optically directed light from both of the two fixed position ultra-wide angle lenses strikes a single surface of a single image sensor. The single image sensor converts an optical signal into an electronic signal permitting a digital storage of image data for the three hundred and sixty degree horizontal field of view and the at least two hundred and seventy degree vertical field of view.

DETAILED DESCRIPTION

Figure 1A:
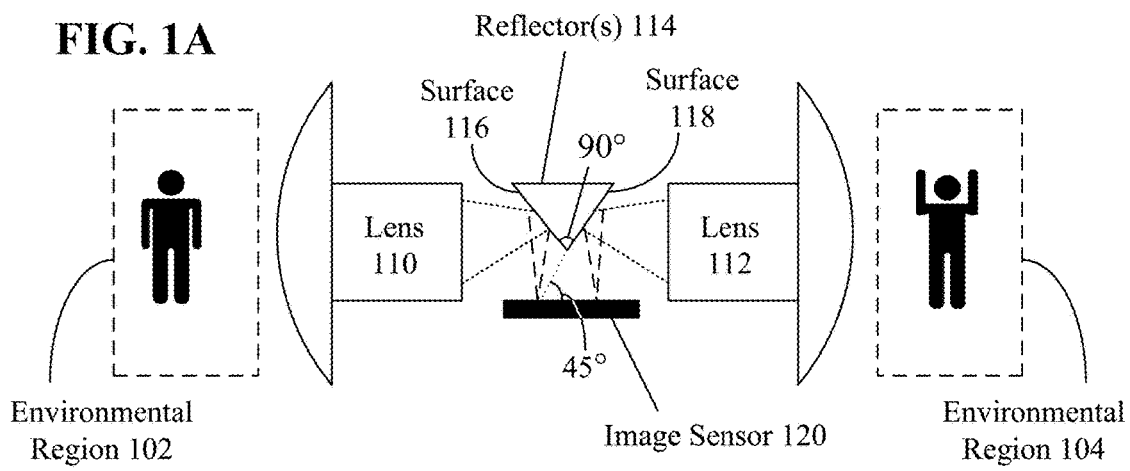
FIG. 1A shows two lenses of an optical device that facing substantially opposing directions, where light from the lenses is directed to a surface of a single image sensor in accordance with an embodiment of the disclosure.
Figure 1B:
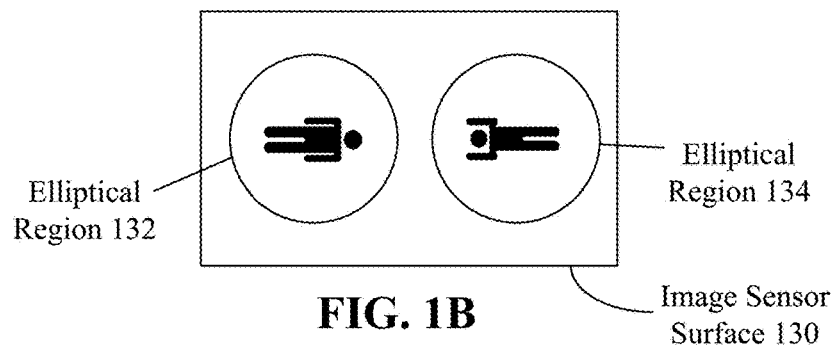
FIG. 1B shows two regions of an image sensor upon which light from two opposing senses strikes in accordance with an embodiment of the disclosure.

Embodiments of the disclosure detail a video/image capturing solution that utilizes at least two distinct lenses facing in substantially opposing directions where light from the lenses is directed to fall upon to different regions a single sensor. These lenses can be wide-angled lenses with overlapping field of views, permitting optical information to be captured within an approximate three hundred and sixty degree arc from a horizontal plane. In one embodiment, optical information can also be captured in an approximate three hundred and sixty degree arc from a vertical plane. Light from the opposing lenses can be optically directed to fall upon a single sensor, which in embodiments is substantially planar, although curved optical sensors are contemplated in embodiments. The direction of light can occur through a reflective/refractive arrangement of reflectors (like mirrored surfaces) or other light directing optics. Optical waveguides of various types are also contemplated to directed light from lenses to the single optical sensor, as detailed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Software instructions can be executed to smoothly stitch together the views from the two opposing directional lenses to form a single combined panoramic image. Processing cycles needed to effectively stitch together these images are significantly less than those required to smoothly combine images from three or more lenses. A variety of digital signal processing (DSP) algorithms can also be used to correct for distortion correction resulting from using ultra-wide angle lenses.

Figure 1C:
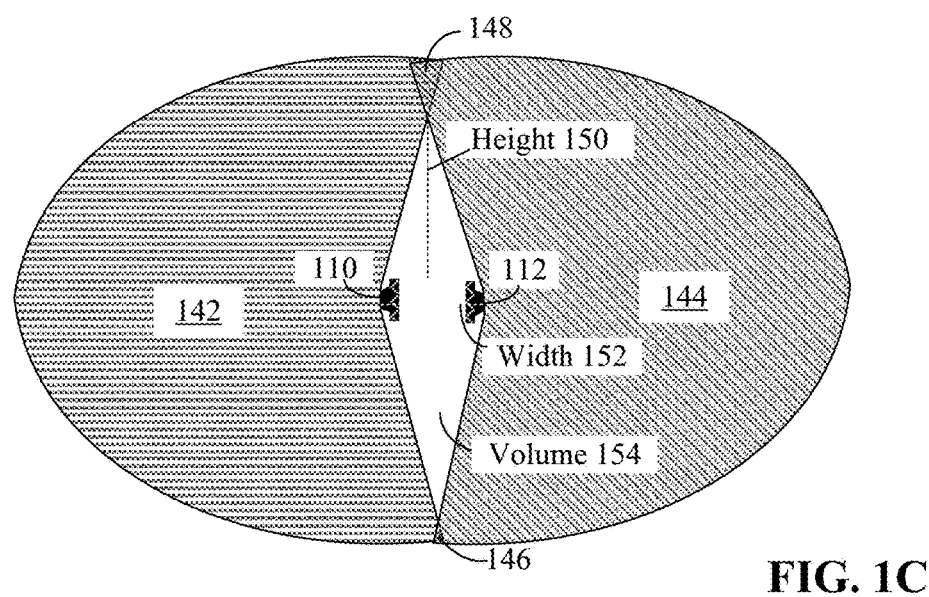
FIG. 1C shows overlapping capture regions from two lenses facing in opposing directions in accordance with an embodiment of the disclosure.

Referring to FIG. 1A, a system 100 of at least two lenses 110, 112 faced in different directions is shown, where light directed through the lenses is optically directed to a surface of a single image sensor 120, in accordance with an embodiment of the disclosure. Per FIG. 1A, lenses 110, 112 facing substantially opposite directions capture imagery from environmental region 102 and environmental region 104, respectively. It should be appreciated that the regions 102 and 104 are not necessarily shown to scale to represent the field of view of the respective lenses 110, 112, but are shown in a simplistic form to illustrate concepts presented herein. The lenses 110 and 112 are ultra-wide angle lenses, in one embodiment, together capturing a field of view of at least 360 degrees horizontally and 270 degrees or more vertically, as shown in FIG. 1C. Light from lens 110 (containing optical information from environmental region 102) strikes elliptical region 132 of the surface of the image sensor 130. Light from lens 112 (containing optical information from environmental region 104) strikes elliptical region 134 of the surface of the image sensor 130. In one embodiment, elliptical region 132 and elliptical region 134 are non-overlapping, mutually exclusive regions of the image sensor surface 130. The image sensor surface 130 may have uniform sensitivity in one embodiment. In another embodiment, the image sensor surface 130 may have non-uniformly arranged light sensors optimized to capture information in only (or primarily) elliptical regions 132 and 134 without needing to capture information outside of these elliptical regions 132, 134. Manufacturing considerations and costs may be considerations in determining whether uniform or non-uniform light sensor sensitivity is utilized in contemplated embodiments of the disclosure.

The overall size and shape of the elliptical regions 132 and 134 can vary depending on the sensitivity of the image sensor surface 130, the lens 110, 112 specifics, and/or depending on the light-guiding arrangement used. For example, in an arrangement where the ultra-wide lens 110, 112 is a fisheye lens and where light guiding mechanism retains the optical region from the lens without substantial distortion of region boundaries, the elliptical region 132, 134 can be a circle consistent with a circular optical footprint of the fisheye lens. In embodiments where an elliptical lens 110, 112 is selected for the same arrangement, the region 132, 134 can be an ellipse-shaped region consistent with an elliptical footprint of the respective lenses.

Embodiments are contemplated where the light guiding mechanisms distort the region (default optical footprint) produced by the lens, so that the region 132, 134 is inconsistent with this default optical footprint of the corresponding lens. So long as consistent distortions are produced, software corrections of the resulting electronic data can be used to compensate for these deviations. Some deviations (as ultra-wide lenses naturally distort environmental imagery) from the lens footprint can be intentionally utilized to ensure that a distribution of light is adjusted to minimize the distortive effects by the lenses 110, 112. For example, a fisheye lens typically produces a strong visual distortion, which can be minimized by the light-guiding optics before the light strikes the image sensor surface 130, where it is converted into electrical signals. Calibration of an optical arrangement can be performed via software/firmware calibrations for such embodiments utilizing contemplated techniques known to those of skill in the art. Although shown an elliptical region 132, 134, embodiments of the invention are contemplated where the respective regions are not ellipses. For example, optical distortions of an elliptical footprint from the lens 110 can be introduced when guiding the light to the image sensor surface 130, to ensure the region at which light strikes is maximized. That is, assuming an image sensor surface 130 with a uniform distribution of sensors, the surface size can be minimized by maximizing the portion of the surface 130 struck by light from lens 110, 112 regardless of default geometry of the light from the respective lenses 110, 112. These deviations in the default light footprint from the lens 110, 112 can be software/firmware corrected to extract digitally encoded information consistent with the captured environmental region 102 and 104.

The image sensor surface 130 can be a conventional planar surface in one embodiment. In another embodiment, the image sensor surface 130 itself can be curved. The curvature can be consistent with the light redirection to minimize optical guiding components utilized, in embodiments where the image sensor surface is curved.

Different arrangements are therefore contemplated by this disclosure through which light is guided from the lenses 110, 112 to the image sensor surface 130. In one arrangement, illustrated by FIG. 1A, a reflector 114 is positioned between light paths of lens 110 and 112 to reflect light onto the image sensor 120. As shown, the reflector can have two substantially planar surfaces, surface 116 and surface 118. A respective angle of surface 116 relative to surface 118 can be approximately (+/−10 percent) ninety degrees. The respective angle between each surface 116, 118 and the image sensor 120 can be approximately (+/−5 percent) the same. As shown, an approximate 45 degree angle (+/−10 percent depending on the angle of the surfaces 116, 118 relative to the light path) exists between each surface 116, 118 of the reflector 114 and the image sensor 120.

Figure 1D:
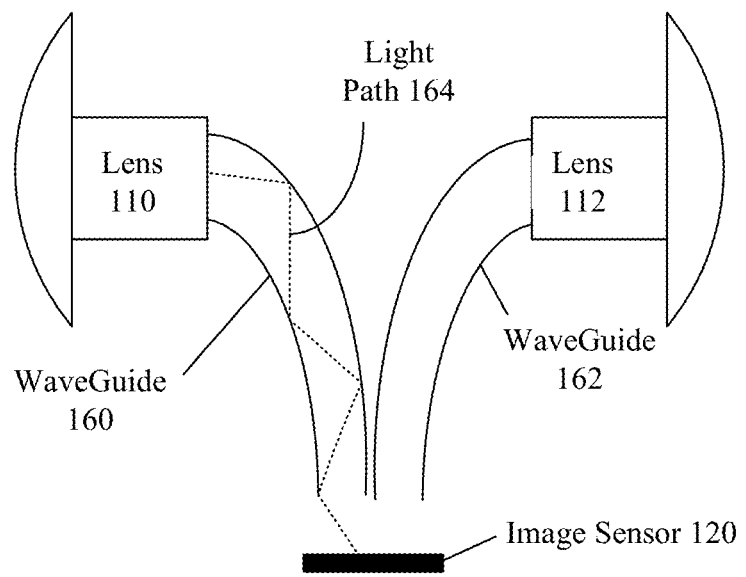
FIG. 1D shows a waveguide directing light from two lenses facing in opposing directions to an image sensor in accordance with an embodiment of the disclosure.
Figure 1E:
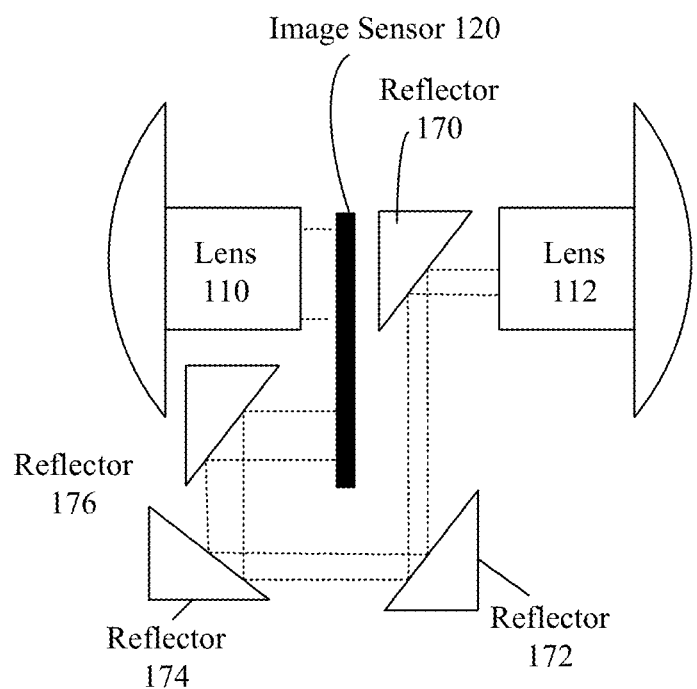
FIG. 1E shows an embodiment for directing light from two lenses facing in opposing directions to an image sensor.
Figure 1F:
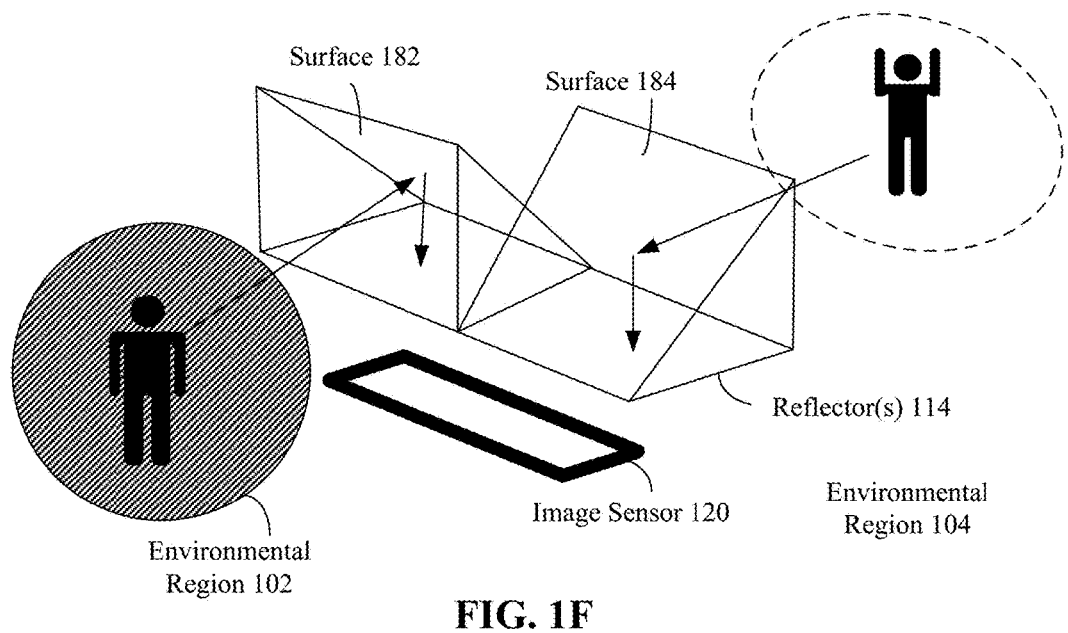
FIG. 1F shows two lenses of an optical device that facing substantially opposing directions, where light from the lenses is directed to a surface of a single image sensor in accordance with an embodiment of the disclosure.
Figure 1G:
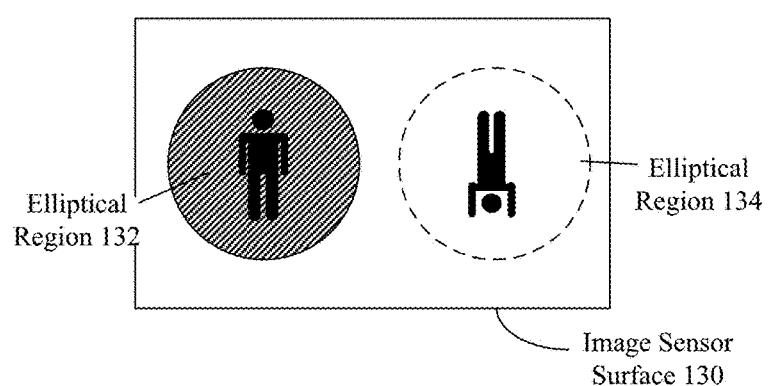
FIG. 1G shows two regions of an image sensor upon which light from two opposing senses strikes in accordance with an embodiment of the disclosure.

FIGS. 1F and 1G shows an alternative arrangement to that of 1A and 1B, where the reflectors 114 used has two different surfaces 182, 184. Like in FIG. 1A, the light from each lens (not shown for clarity of expression in 1F) is reflected upon a surface of the image sensor 120. Optically, the arrangement of surfaces 182, 184 is approximately equivalent to that of surfaces 116, 118, such that surfaces 182 and 184 are able to be angled approximately 45 degrees (+/−10 percent depending on the angle of the surfaces 182, 184 relative to the light path) relative to a surface of the image sensor 120. Constructing a reflective module consistent with FIG. 1F permits a more compact physical structure in some use cases. Other optically equivalent arrangements within the skill level of one of ordinary skill (other than those explicitly shown) are to be considered within scope of embodiments of the disclosure.

An alternative to the illustrated embodiment of FIGS. 1A (and 1F) is to add a curve to reflective surface 116 and/or 118 (and/or surfaces 182, 184), which counteracts distortion effects of the lenses 110, 112 to minimize distortions (relative to region 102, 104) of optical information that need to be resolved in a post-processing step after light is converted to electronic information by the image sensor 120.

Another alternative to that shown in FIGS. 1A (and 1F) is to alter the angles of the surfaces 116, 118, 182, and/or 184 (from the 45 degrees relative to the image sensor surface 130), while keeping these angles substantially consistent between the two reflective surfaces 116, 118 (182, 184). Changing this angle can change the distance between the elliptical regions 132, and 134. This spacing between regions 132, 134 can be increased should a region of relatively low sensor density exist in the image surface 130 requiring a gap. For example, the image surface 130 could be (in embodiments) formed from two discrete, non-continuous surfaces with an appreciable gap, and the angles of the surfaces 116, 118 (182, 184) can be adjusted to avoid this gap in sensitivity.

Although in many implementations it can be preferred that the regions 132, 134 are non-overlapping and mutually exclusive to prevent information overlap/confusion/corruption, some embodiments are contemplated where intentional overlapping occurs. For example, in one contemplated embodiment, a polarizing filter can be placed within the optical path between lenses 110 and sensor surface 130 and a differently angled polarizing filter can be placed within the optical path between lenses 112 and sensor surface 130. The net result is that horizontally filtered (by the polarizing filter) optical information can be discerned as being from one lenses 110 and representing one environmental region 102, while optical information that is vertically filtered can be discerned as being from environmental region 104 and/or lenses 112 even though the same image sensor surface 130 is struck. Information can also be "overloaded" using a time domain; by altering (time spacing) a blocking filter linked to lens 110 and a different blocking filter linked to lenses 112. Those of ordinary skill can recognize that optical/time based filters are commonly utilized in the industry to produce three dimensional effects from a two-dimensional screen (by altering information conveyed to different eyes of an end-user). Technologies exist in the 3-D image processing (and 4-D processing space) that are able to 'overload' a sensor region, while permitting distinct extraction at a later time, which are contemplated for use for embodiments of the disclosure.

FIG. 1D shows another contemplated embodiment of the disclosure, where one or more optical waveguides 160, 162 are used to optically guide light from the lens 110, 112 before it strikes the image sensor 120. Appreciably, an optical waveguide is a physical structure that guides electromagnetic waves in the optical spectrum. Common types of optical waveguides include optical fiber and rectangular waveguides. Any type of optical waveguide is able to be utilized herein, so long as light from the lenses 110, 112 is guided to image sensor 120 where it is able to be converted into an electronic signal. Complex light paths 164 through a waveguide 160, 162 can be utilized, which may require calibration of the device to ensure software/firmware is able to reconstruct optical data consistent with environmental region 102 and/or 104. Use of flexible waveguides, like optical fibers, have advantages in terms of cost and flexibility of implementation, in contemplated embodiments—when compared to use of sensitive reflective techniques to guide the light. The guiding of light from the lenses to the surface is not restricted to reflective techniques, but refractive light guiding technologies can also be utilized in contemplated embodiments. For example, a dielectric slab waveguide (consisting of different dielectric layers with different refractive indexes, for instance) can be utilized to contain and guide light. In various embodiments, two dimensional waveguides such as a strip waveguide, a rib waveguide, a segmented waveguide, a photonic crystal waveguide, a laser inscribed waveguide, and the like can be used. Optical waveguides 160, 162 as detailed herein can be constructed of glass, polymer, semiconductor, and other such materials or combinations therefore.

FIG. 1E shows another contemplated embodiment of the disclosure, where light from one lens 110 directly strikes the image sensor 120 and where a light path from lens 112 is guided to strike the same surface of sensor 120. As shown, a series of reflectors 170, 172, 174, and 176 are used to direct light from lens 112 to a region (region 134) of the surface 130 of image sensor 120. A waveguide (as discussed in FIG. 1D) can be utilized to the same effect as using one or more of the reflectors 170, 172, 174, 176. Combinations of reflectors and waveguides are also contemplated. FIG. 1E is intended to illustrate that arrangements are contemplated where the light path of one lens 110 is not guided by additional optical components but falls directly on a surface 130 of image sensor 120. A continuum where different amounts of light guiding for either of the lenses 110, 112 are contemplated between the extremes of parallel (identical guiding for each lens 110 relative to the sensor surface 130—as shown by FIG. 1A) to no guiding for one lens 110 and guiding of effectively 180 degrees (with a shift for surface region) for the other lens 112 (as shown by FIG. 1E).

As previously noted, and as expressed by FIG. 1C, the regions captured by lenses 110, and 112 are designed to be substantially overlapping such that a 360 degree (in both vertical and horizontal planes, although one plane may be partially obscured) is contemplated, which shall now be elaborated upon in an additional depth. Lenses 110, and 112 can be fixed lenses having a stationary position relative to each other. Lens 110 and 112 each can be an ultra-wide lens able to capture a field of view (FOV) (e.g., FOV 142, 144) of greater than 180 degrees. It should be appreciated that field of view can include non-ultra-wide angle fields of view associated with wide angle optics, telescopic optics, and the like. An area of overlap (shown as cross sectional area 146 and 1148) can exist for the lenses 110, 112. The cross sectional areas 142, 144 may be slightly different, as while the lenses 110, 112 face in substantially opposing directions, some variance (e.g., +/− five degrees) from opposing direction exists in contemplated embodiments.

A conical volume 152 with a height 150 and a width 152 about the device can be omitted (e.g., not covered) by lens 110 or by lens 112, and is therefore a known "blind spot." Other than this blind spot, a full three hundred and sixty horizontal FOV and a full three hundred and sixty vertical FOV can be achieved in embodiments of the device using two fixed lenses 110, 121. The body of the optical device enclosing the lenses 110, 112 may be shaped to approximately (within twenty five percent by body volume in one embodiment) fall within volume 154. The body of the optical device so shaped would minimally block FOV 142 or FOV 144.

In one embodiment, a front-side lens (110) and a rear-side lens (112) can be integrated within an electronic device (e.g., camera, smart phone, and tablet). In one embodiment, a front-side lens (110) can capture an image and a subsequent image at two different focal distances. In one instance, lens can record an image at a focal distance (e.g., focal plane) of five feet and can be manually triggered responsive to a user operation (e.g., pan/tilt/zoom) to capture a subsequent image at a different focal distance (e.g., focal plane) of twenty feet. A resulting image can include a field of view (FoV) 142 (e.g., focal distance of twenty feet and a different time-spaced image can include a field of view (e.g., a focal distance of five feet). In one embodiment, a rear-side lens (112) can capture an image and a subsequent image at two different focal distances. In one instance, lens 112 can record an image at a focal distance (e.g., focal plane) of five feet and can be manually triggered responsive to a user operation (e.g., pan/tilt/zoom) to capture a subsequent image at a different focal distance (e.g., focal plane) of twenty feet. The one or more images (from each lens 110, 112) can be combined or stitched together into a single image, in one contemplated embodiment, which is an image that has a three hundred and sixty degree coverage.

Figure 2:
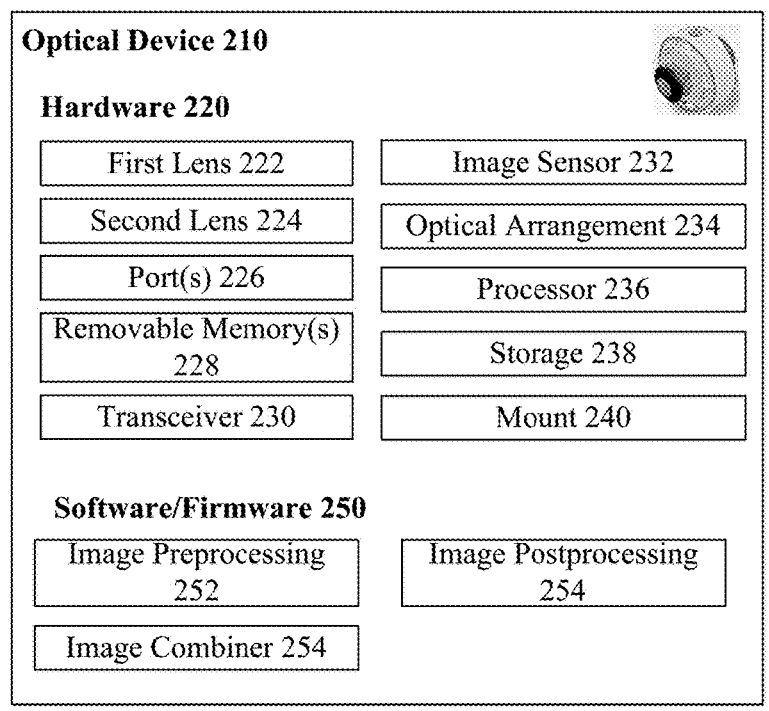
FIG. 2 is a diagram for a two-lens optical device that utilizes a single image sensor for both lenses in accordance with an embodiment of the disclosure.

FIG. 2 is a diagram for a two-lens optical device 210 that utilizes a single image sensor 232 for both lenses 222, 224 in accordance with embodiments of the disclosure. The optical device 210 includes hardware 220 and software/firmware 250.

The hardware 220 includes, but is not limited to, a first lens 222, a second lens 224, a set of ports 226, removable memory(s) 228, a transceiver 230, an image sensor 232, an optical arrangement 234 for guiding light from the senses 222, 224 to a surface of the image sensor 232, a processor 236, storage 238, and/or mount 240. Not all implementations need all hardware 220 components detailed herein. The first and second lenses 220, 222 can have a visual viewing angle of at least 180 degrees in a direction in which it faces. Light from the lenses 222, 224 can be guided to the surface of image sensor 232 by optical arrangement 234, as elaborated upon in FIG. 1A-1E.

The first lens 222 and the second lens 224 are opposite (or substantially opposite) facing wide or ultra-wide angle lenses. An ultra-wide angle lens may refer to a lens whose focal length is shorter than the short side of film or sensor. Each ultra-wide lens may be a fisheye lens with curvilinear barrel distortion or a rectilinear lens, which is designed so that straight lines in a scene render straight thereby minimizing barrel distortion. In one embodiment, one or more of the lenses 222, 224 can be controlled distortion panoramic lenses or anamorphic imagers. Any of a variety of ultra-wide angle lenses is contemplated for use herein. For example, in embodiments, longer lenses 222 and/or 224 magnify the focal target more, apparently compressing distance and (when focused on the foreground) blurring the background because of their shallower depth of field. Wider lenses tend to magnify distance between objects while allowing greater depth of field. Another result of using a wide-angle and ultra-wide lens is a greater apparent perspective distortion when the camera is not aligned perpendicularly to the subject: parallel lines converge at the same rate as with a normal lens, but converge more due to the wider total field. For example, buildings appear to be falling backwards much more severely when the camera is pointed upward from ground level than they would if photographed with a normal lens at the same distance from the subject, because more of the subject building is visible in the wide-angle shot.

There are two varieties of lenses 222, 224 either of which are usable herein that include short-focus lenses and retrofocus lenses. Short-focus lenses are generally made up of multiple glass elements whose shapes are more or less symmetrical in front of and behind the diaphragm. As the focal length decreases, the distance of the rear element of the lens from the film plane or digital sensor also decreases. This makes short-focus wide-angle lenses undesirable for single-lens reflex cameras unless they are used with the reflex mirrors locked up. On large format view cameras and rangefinder cameras, short-focus lenses are widely used because they give less distortion than the retrofocus design and there is no need for a long back focal distance. The retrofocus lens solves this proximity problem through an asymmetrical design that allows the rear element to be further away from the film plane than its effective focal length would suggest. (e.g., Angénieux retrofocus.)

There are a number of varieties of wide-angle lenses 222, 224, which are suitable for use in the disclosed innovations. For example, a controlled distortion panoramic lens is contemplated for incorporation with the various innovations. One such controlled distortion lens is sometimes referred to as a panomorph lens. A panomorph lens is a particular type of panoramic lens that is part of the hemispheric wide-angle lens family. These lenses have 360 degree coverage with enhanced resolution adjusting pixel density in predefined zones of interest. The concept of panomorph lenses consists of creating better optical performance in zones of interest and matching sensor anamorphic ratio. The origin of panomorph technology dates back to 1999. In specific situations, Panomorph lenses can be a viable alternative to fisheye and catadioptric lenses. Two important parameters for the panomorph lens are the amount and location of the resolution. These parameters, introduced at the optical design stage, allow the panomorph lens to provide a higher resolution in a defined zone than any other standard panoramic imager. By choosing between the use of anamorphosis and/or significant controlled optical distortion, an increased number of pixels in a targeted area are achieved. Panomorph lenses can be designed with specific object to image mapping function, making it possible to use algorithms to de-warp an image and correct distortion while maintaining a higher number of pixels in the zone of interest. Stated differently, panomorph lenses are also categorized as anamorphic imagers, relating to the fact that the distortion profile is not rotationally symmetrical. Another known advantage of panomorph lenses is that the image footprint is a super-ellipse and thus covers more efficiently the rectangular sensor area. Regardless of the specifics of lens used, software and firmware (250) based solutions can correct for lens-based distortions. Wide or ultra-wide lens to rectolinear conversions exist in a variety of forms.

The image sensor 232 is a component that converts an optical image into an electronic signal. Any of a variety of image sensors technologies can be for the image sensors 232 including, but not limited to, semiconductor charge-coupled devices (CCD), active pixel sensors in complementary metal-oxide-semiconductor (CMOS), and N-type metal-oxide-semiconductor (NMOS, Live MOS) technologies.

The optical arrangement 234 refers to any of a variety of components that optically direct light from the lens 222, 224 to the surface of the image sensor 232. Reflection and refraction technologies can be utilized by the optical arrangement 234, as detailed in sections above and as expressed for FIG. 1A-1E.

The ports 226 can include input/output ports for connecting a physical connector. Data and/or power may be conveyed over one or more of the ports 226. Ports 226 can include, but are not limited to, a universal serial bus (USB) port, a High-Definition Multimedia Interface (HDMI) port, a power port, a IEEE 1394 (FireWire) port, a DisplayPort, an E-SATA port, an Ethernet port, an audioport, and/or alternatives and derivatives thereof.

The removable memory(s) 228 can be a non-transitory (non-volatile) storage that is able to be coupled/decoupled by a user of the optical device 210 without significantly breaching integrity of the device's body/casing. The removable memory(s) 228 can include, but are not limited to, a Security digital (SD) card, a SD high capacity card (SDHD), an eXtended capacity (SDXC) card, and/or a SD Input Output (SDIO) in full, mini or micro sizes. Other Flash memory extenders (like a USB flash drive) can be considered removable memory(s) 228 in contemplated embodiments.

The transceiver 230 can be a component able to transmit and receive data over a network, which may be a personal area network (PAN), a local area network (LAN), or a wide area network (WAN). The transceiver 230 can be a wired or a wireless transceiver. The network to which the transceiver links 230 can be a vehicle communication network in one embodiment. In another embodiment, the network of the transceiver 230 can be a stand-alone one capable of independent communication with an IP based network and/or a telephony network without relying upon other in-vehicle networking components.

The processor 236 refers to a central processor unit that is hardware that carries out instructions of a computer program by performing arithmetical, logical, and input/output operations. The processor 236 can be a single core or a multicore processing unit. The processor 236 may be integrated into an integrated circuit, such a system on a chip (SOC) board.

The storage 238 represent data stores able to be physically implemented within any type of hardware including, but not limited to, a magnetic disk, an optical disk, a semiconductor memory, a digitally encoded plastic memory, a holographic memory, or any other recording medium. The storage 238 can be a non-transitory storage medium, which excludes carrier waves, signal mediums, and other forms of energy. Storage 238 can be a stand-alone storage unit as well as a storage unit formed from a plurality of physical devices. Storage 238 can utilize one or more encryption mechanisms to protect stored data from unauthorized access.

The mount 240 is a coupling device/mechanism permitting the optical device 210 to be secured in space. The mount 240 can be designed for tripod attachment, for attachment to a fixture, a stand for resting on a substantially flat surface, a rod for inserting a rope/string/wire from which device 210 may thereafter be suspended, and the like.

The software/firmware 250 includes stored program instructions able to be executed by the processor 236. Software/firmware 250 can include, but is not limited to, image pre-processing 252, an image combiner 254, and image post processing 254. Image preprocessing 252 refers to software that manipulates digital representations of one or more images as captured form either the first lens 222 or the second lens 224. Preprocessing functions are executed before images from both lenses 222, 224 are combined into a single image. Image combiner 254 represents program implemented functions for combining images taken from the first and the second lenses 222, 224 to form a single panoramic image. Image post processing 254 represents program implemented functions performed on digital images that have been combined (after image combiner 254 functions have executed). In various embodiments, functions represented by image preprocessing 252, image combiner 254, and/or image post processing 254 may be performed on devices external from optical device 210.

Figure 3:
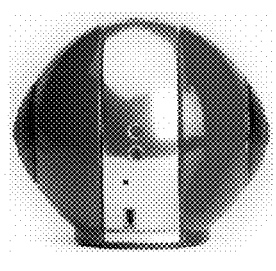
FIG. 3 shows a spherical configuration of an optical device in accordance with an embodiment of the disclosure.
Figure 4:
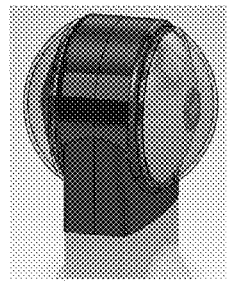
FIG. 4 shows an optical device having lenses protected by a transparent hemisphere in accordance with an embodiment of the disclosure.
Figure 5:
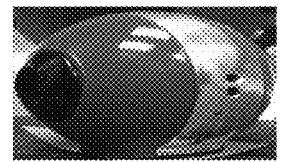
FIG. 5 shows an ellipsoid shaped optical device in accordance with an embodiment of the disclosure.

The case or body of the optical device 210 can be designed to be minimally intrusive, so as not to block a line of sight for the first lens 222 or the second lens 224. Whatever blockage occurs (if any) may be intentionally minimized by designing the shape of the optical device 210 to largely (75% or greater by overall volume) fit within volume 134, as described in context of FIG. 1. Three such shapes are shown by FIGS. 3, 4, and 5. The disclosure is not to be construed as limited to these shapes, and others are contemplated. Generally, forming the body of the device so that it curves backwards from the fixed lens 222, 224 position permits necessary hardware 220 components to be conveniently housed, while minimizing obstructions of the lenses 222, 224.

In one embodiment, the case or body of the optical device 210 can be constructed in three distinct sections, each approximately circular or elliptical in cross sectional shape, where the cross sections are orthogonal to a facing direction of the first and second lens 222, 224. Two outer cross sections can be mirror images of each other and can taper towards their endpoints, within which the first and second lenses 222, 224 are mounted/housed. The central cross section can have a cross sectional diameter greater than either of the tapering sections. The central cross section can be cylindrically shaped or can have an increasing cross sectional diameter to its center or midpoint.

In one embodiment, positive (optically active) elements (if any, such as a transparent encasement containing one or more of the lenses or a portion of a body that light is to penetrate to be captured by one of the lenses 222, 224) the body or casing of the optical device 210 can be made from polymethyl methacrylate (PMMA, or acrylic), other transparent thermoplastic, glass, or other suitable substances. Negative elements (optically inactive) of the body or casing of the can be made of polycarbonate, other thermoplastic polymers, metal, or other suitable substances.

FIG. 3 shows a spherical configuration of an optical device having a solid central ring sandwiched between parallel hemispheres, which have a lens at their apex. In one contemplated embodiment, the distance between lenses (e.g., width 152) compared to the height (e.g., height 150) of the device can be in accordance with approximately a 6 to 5 ratio. Hence, a device as shown in FIG. 3 could be 2.3 inches high and 2.7 inches long, for example.

FIG. 4 shows an optical device having lenses protected by a transparent hemisphere. Use of the protective transparent substance may be challenging in high-glare situations, although optical filters and polarized lens may be used to minimize these challenges.

FIG. 5 shows an ellipsoid shaped optical device having a substantially greater width (e.g., width 152) than height (e.g., height 150), such as in accordance to a 2 to 1 ratio. One of ordinary skill can recognize from these examples, that numerous shapes are contemplated, which may depend on optical characteristics of the lenses used and on a form factor of the panoramic optical device.

To elaborate, an overall shape may be designed to have an outer surface that is substantially (at least ninety five percent) within a volumetric blind spot region (e.g., volume 154 of FIG. 1C). This ensures that field of views of the combined lenses are minimally impeded (meaning line-of-sight for the lenses is not blocked or is minimally blocked) by the body of the optical device. This permits an overlap (see region 148 and 146 of FIG. 1C) in a circular or elliptical cross sectional arch of at least two hundred and seventy degrees. The arch may be a full three hundred and sixty degrees, when the panoramic optical device is suspended in an environment. When the panoramic optical device is positioned on a flat, planar surface (like a table), this surface blocks the circular or elliptical cross sectional arc. Embodiments specifically designed for resting on a planar surface can be designed to deviate from an overall/general shape, since there is no or negligible concern about blocking a lens's line of sight by a device body for a volumetric space that will naturally be blocked during a designed for use-case by a planar surface upon which the device rests.

As shown by FIG. 3-5, an outer surface of a body or casing of the optical device may have a set of parallel cross sectional planes (orthogonal to a facing direction of the lenses), which are substantially circular or elliptical. The radius or diameter of these cross sectional planes can be greatest at approximately a body midpoint (between the lenses) can decrease towards the lenses.

An overall shape of the outer surface or body of the casing can be described in many ways using solid geometry conventions, where the shape may depend on a specific embodiment. For example, the overall shape can be that of a non-degenerate closed quadric surface having curved and opposing end points. In contemplated embodiments, the overall shape can be that of a capsule (e.g., an ideal or mathematically defined capsule). The overall shape can further be that of a sphere or an ellipsoid. When noting the overall shape, some deviations from an ideal shape (mathematically) are expected for reasons of functionality (of the optical characteristics) for manufacturing efficiency, for challenges with electronic component placement, and for aesthetic reasons. For example, a slight offset from a mathematically defined outer shape can exist at a join between a center portion (of a three part sectional body) to either make it easier to join the sections, or to provide greater interior space for placing circuit boards, a battery, a processor, or other components. A bottom portion of the body's shape can be flattened to be able to sit stably on a horizontal or flat surface. A top button and even an access port are expected deviations of an outer surface from an "idealized" shape, as is known or expected by one of ordinary skill. Nonetheless, the idealized shape is recognizable as an ellipsoid or sphere (see FIG. 3, 4, 5) making this shape substantially or approximately that of an ellipsoid or sphere in contemplated embodiments. For quantification purposes, some standard deviations from an overall shape, as defined herein, are within a ten percent deviation by surface area of an idealized shape, within a five percent deviation of a cross sectional idealized curvature, and the like. These deviations are consistent with industry standards and expectations of those of ordinary skill in the art in context of device design.

Figure 6:
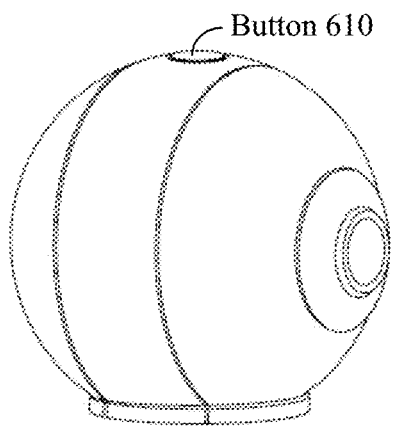
FIG. 6 shows a perspective view of an optical device in accordance with an embodiment of the disclosure.

Referring back to the drawings FIG. 6, 7, 8, 9 are all views of the device shown in FIG. 3. Other shapes are contemplated, as previously noted, and FIG. 6-9 illustrate by example a number of expected components understood to be applicable to embodiments represented by FIG. 4, 5, and the like.

FIG. 6 is a perspective view of the panoramic optical device showing button 610, which can be used to turn the device on/off.

Figure 7:
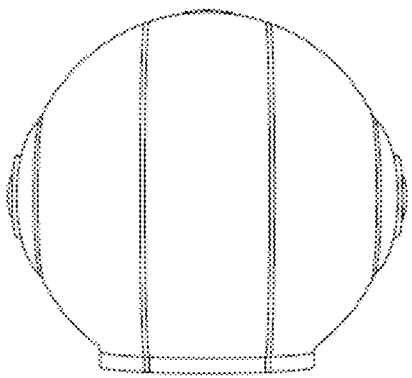
FIG. 7 shows a side view of an optical device in accordance with an embodiment of the disclosure.

FIG. 7 shows a side view of the device.

Figure 8:
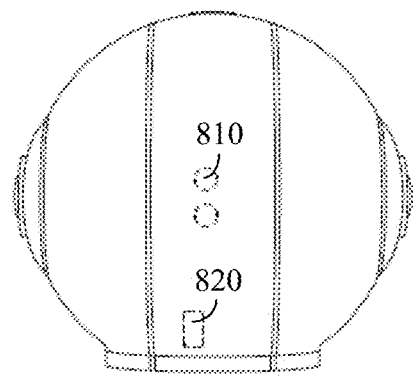
FIG. 8 shows an opposing side view of an optical device in accordance with an embodiment of the disclosure.

FIG. 8 shows an opposing side view with a couple openings 810 for ventilation/sound/optical signal conveyance and with a micro USB 820 port.

Figure 9:
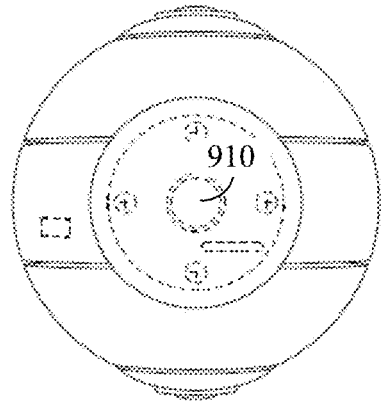
FIG. 9 shows a bottom view of an optical device in accordance with an embodiment of the disclosure.

FIG. 9 shows a bottom view of the device with a flat, threaded mount 910.

Figure 10:
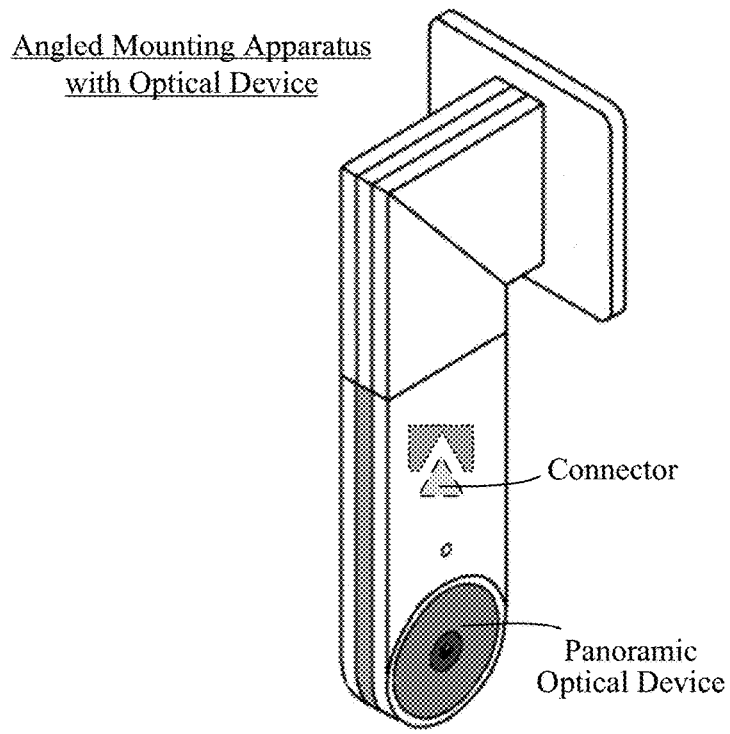
FIG. 10 shows an angled mounting apparatus with an optical device in accordance with an embodiment of the disclosure.

FIG. 10 shows an angled mounting apparatus with an optical device having lenses facing in substantially opposing directions. The mount (as shown) does optically interfere with a portion of the field of view (otherwise captured) by the lenses, but is designed such that the blocked field of view is facing upward (toward a ceiling) when it is anticipated that the areas of concern (for optically capturing information) remain non-obscured.

Figure 11A:
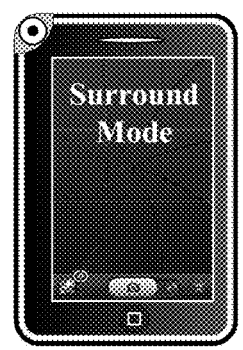
FIG. 11A shows a front view of an optical device in accordance with an embodiment of the disclosure.
Figure 11B:
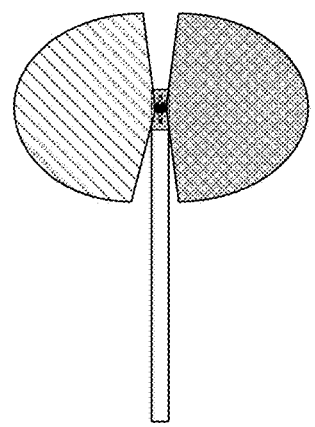
FIG. 11B shows a side view of an optical device in accordance with an embodiment of the disclosure.

FIG. 11A shows a front view and a mobile device and FIG. 11B shows a side view of the mobile device having two lenses facing in substantially opposing directions that utilizes a single image sensor as described herein.

As can be seen, a variety of different configurations for optical devices with opposing lenses facing in substantially opposing directions are contemplated and detailed herein, each of which is to be considered within scope of the disclosure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

What is claimed is:

1. An image capture device comprising:
at least two fixed position ultra-wide angle lenses generally facing opposing directions, wherein a field of view of each of the lenses is greater than one hundred and eighty degrees, using lenses, the image capture device provides a three hundred and sixty degree horizontal field of view and provides at least a two hundred and seventy degree vertical field of view;
at least two optically reflective surfaces, wherein a first reflective surface optically directs light from one of said two fixed position ultra-wide lenses to a first region of a single electronic image sensor, wherein a second reflective surface optically directs light from a second of said two fixed position ultra-wide lenses to a second region of said single image sensor, wherein first and second regions are non-overlapping, wherein said first reflective surface has a first top line segment as its top edge and a first lower line segment as its lower edge, wherein said first reflective surface is angled at forty five degrees plus or minus ten degrees relative to a sensor plane of a top of the single image sensor, wherein a first perpendicular plane between the first top line segment and the sensor plane has a first bottom line segment as an edge, wherein said second reflective surface has a second top line segment as its top edge and a second lower line segment as its lower edge, wherein said second reflective surface is angled at forty five degrees plus or minus ten degrees relative to said sensor plane, wherein a second perpendicular plane between said second top line segment and said sensor plane exists has a second bottom line segment as an edge, wherein said first lower line segment is collinear with said second bottom line segment, wherein said first bottom line segment is collinear with said second lower line segment, wherein said first bottom line segment, said first lower line segment, said second bottom line segment, and said second lower line segment are coplanar in a plane parallel to said sensor plane;

said single electronic image sensor that converts optical image information contained within light striking said light sensitive plane into electronic information contained within an electronic signal such that the electronic information is a digital encoding of imagery information; and a case that contains said at least two fixed position ultra-wide angle lenses, said at least two optically reflective surfaces, and said single electronic image sensor.

2. The image capture device of claim 1, wherein said first reflective surface is positioned at an angle of approximately ninety degrees relative to said second reflective surface acknowledging an offset exists between said first top line segment and said second top line segment that is equivalent to a distance between a distance of an offset between said first lower line segment and said second lower line segment, wherein a plane of said single image electronic sensor is positioned at approximately forty five degrees relative to said first reflective surface and relative to said second reflective surface, wherein said first reflective plane optically directs light from a first one of said two fixed position ultra-wide lenses to said single image sensor, wherein said second reflective plane optically directs light from a second one of said two fixed position ultra-wide lenses to said single image electronic sensor.

3. The image capture device of claim 1, wherein an angle between said first reflective surface and said sensor plane is the same as an angle between said second reflective surface and said sensor planea plane of the first region of said single image electronic sensor is within five percent of an angle between said second reflective surface and a plane of said second region of said single image electronic sensor.

4. The image capture device of claim 1, wherein said first and second two optically reflective surfaces optically direct light from said two fixed position ultra-wide angle lenses causing directed light to strike said first region and said second region of said single image electronic sensor, wherein said first region and said second region are elliptical regions of a single plane of a continuous sensor laden surface of said single image electronic sensor.

5. The image capture device of claim 1 further comprising: a casing said casing prevents blockage of the field of view of either of said two ultra-wide angle lenses.

6. An image capture device comprising:
at least two fixed position ultra-wide angle lenses facing substantially opposing directions, wherein a field of view of each of said lenses is greater than one hundred and eighty degrees, wherein said image capture device provides a three hundred and sixty degree horizontal field of view and provides at least a two hundred and seventy degree vertical field of view;

at least one component to optically direct light from at least one of said two fixed position ultra-wide angle lenses, such that optically directed light from both of said two fixed position ultra-wide angle lenses strikes a sensor laden continuous surface of a single electronic image sensor, wherein two mutually exclusive, non-overlapping, elliptical regions of the surface of the single electronic image sensor exist, one of said two mutually exclusive non-overlapping elliptical regions representing a region upon which light from a first of said two fixed position ultra-wide lenses strikes, a different one of said two mutually exclusive non-overlapping elliptical regions representing a second region upon which light from a second of said two fixed position ultra-wide lenses strikes, wherein said at least one component comprise a first reflective surface and a second reflective surface, wherein said first reflective surface has a first top line segment as its top edge and a first lower line segment as its lower edge, wherein said first reflective surface is angled at forty five degrees plus or minus ten degrees relative to a sensor plane of a top of said single electronic image sensor, wherein a first perpendicular plane between said first top line segment and the sensor plane exists has a first bottom line segment as an edge, wherein the second reflective surface has a second top line segment as its top edge and a second lower line segment as its lower edge, wherein said second reflective surface is angled at forty five degrees plus or minus ten degrees relative to said sensor plane, wherein a second perpendicular plane between said second top line segment and said sensor plane exists has a second bottom line segment as an edge, wherein said first lower line segment is collinear with said second bottom line segment, wherein said first bottom line segment is collinear with said second lower line segment, wherein said first bottom line segment, said first lower line segment, said second bottom line segment, and said second lower line segment are coplanar in a plane parallel to said sensor plane;

said single image electronic sensor that converts optical image information contained within signal such that the electronic information is a digital encoding of imagery information for said image capture three hundred and sixty degree horizontal field of view and the at least two hundred and seventy degree vertical field of view; and a case that contains said at least two fixed position ultra-wide angle lenses, at least one component to optically direct light, and said single electronic image sensor.

7. The image capture device of claim 6, wherein said at least one component to optically direct light comprise:
at least two optically reflective surfaces, comprising a first reflective surface and a second reflective surface, wherein said first reflective plane optically directs light from a first one of said two fixed position ultra-wide lenses to aid first one of the two mutually exclusive, non-overlapping elliptical regions of said single image electronic sensor, wherein said second reflective plane optically directs light from said second one of said two mutually exclusive, non-overlapping elliptical regions of said single image electronic sensor.

8. The image capture device of claim 6, wherein an angle between said first reflective surface and said sensor plane is the same as an angle between said second reflective surface and said sensor plane wherein an angle between said first reflective surface and a plane of said first region of the single image sensor is within five percent of an angle between said second reflective surface and a plane of said second region of said single image electronic sensor.

9. The image capture device of claim 6, wherein said at least one component to optically direct light further comprises at least one optical waveguide.

10. The image capture device of claim 9, wherein said at least one optical waveguide comprises at least one fiber optic line.

11. The image capture device of claim 9, wherein said at least one optical waveguide comprises a slab waveguide consisting of at least three layers of materials with different dielectric constants.

12. An image capture device comprising:
- at least two fixed position ultra-wide angle lenses facing substantially opposing directions, wherein a field of view of each of said lenses is greater than one hundred and eighty degrees, wherein facing said lenses in generally opposing directions results in an overlapping region of image capture to provide a three hundred and sixty degree horizontal field of view and to provide at least a two hundred and seventy degree vertical field of view;
- at least one or more components to optically direct light from at least one of the two fixed position ultra-wide angle lenses, such that optically directed light from both of the fixed position ultra-wide angle lenses strikes a single surface of a single image electronic sensor,
- wherein said at least one component to optically direct light comprise a first reflective surface and a second reflective surface, wherein said first reflective surface has a first top line segment as its top edge and a first lower line segment as its lower edge, wherein said first reflective surface is angled at forty five degrees plus or minus ten degrees relative to a sensor plane of a top of said single image electronic sensor, wherein a first perpendicular plane between said first top line segment and said sensor plane exists has a first bottom line segment as an edge, wherein said second reflective surface has a second top line segment as its top edge and a second lower line segment as its lower edge, wherein said second reflective surface is angled at forty five degrees plus or minus ten degrees relative to said sensor plane, wherein a second perpendicular plane between said second top line segment and said sensor plane exists has a second bottom line segment as an edge, wherein said first lower line segment is collinear with said second bottom line segment, wherein said first bottom line segment is collinear with said second lower line segment, wherein said first bottom line segment, said first lower line segment, said second bottom line segment, and said second lower line segment are coplanar in a plane parallel to said sensor plane;
- said single image electronic sensor that converts an optical signal into an electronic signal; and
- a case that contains said at least two fixed position ultra-wide angle lenses, at least one component to optically direct light, and said single electronic image sensor.

13. The image capture device of claim 12, wherein said single image electronic sensor converts optical image information contained in the optical signal into electronic information.

14. The image capture device of claim 12, wherein said at least one component to optically direct light comprise:
- at least two optically reflective surfaces, comprising a first reflective surface and a second reflective surface, wherein the first reflective plane optically directs light from a first one of said two fixed position ultra-wide lenses to said first one of the two mutually exclusive, non-overlapping elliptical regions of said single image electronic sensor, wherein said second reflective plane optically directs light from said second one of said two mutually exclusive, non-overlapping elliptical regions of said single image electronic sensor.

15. The image capture device of claim 12, wherein said at least one components to optically direct light further comprises at least one optical waveguide.

16. The image capture device of claim 15, wherein said at least one optical waveguide comprises at least one fiber optic line.

17. The image capture device of claim 15, wherein said at least one optical waveguide comprises a slab waveguide consisting of at least three layers of materials with different dielectric constants.

18. The image capture device of claim 12, wherein said at least one component to optically direct light optically direct light from a first of said two fixed position ultra-wide angle lenses into a first region of the single surface of said single image electronic sensor and from a second of said two fixed position ultra-wide angle lenses onto a second region of said single electronic surface, wherein said first region and said second region are both continuous regions, wherein said first region does not overlap with said second region.

19. The image capture device of claim 18, wherein said first region and said second region are both elliptical regions.

20. The image capture device of claim 12, further comprising: a non-transitory storage medium for storing digital information contained in the electronics signal from said single image electronic sensor, wherein the electronic signal represent imagery information for the image capture of said three hundred and sixty degree horizontal field of view and said at least two hundred and seventy degree vertical field of view.

* * * * *